US006382327B1

(12) United States Patent
Mosdal

(10) Patent No.: US 6,382,327 B1
(45) Date of Patent: May 7, 2002

(54) HINGE STRUCTURE FOR AN IMPLEMENT

(75) Inventor: Brian Thomas Mosdal, Ankeny, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/541,219

(22) Filed: Apr. 3, 2000

(51) Int. Cl.[7] ............................................. A01B 73/04
(52) U.S. Cl. ...................................... 172/311; 172/452
(58) Field of Search .............................. 172/311, 457, 172/452, 456, 776; 111/54, 55, 56, 57

(56) References Cited

U.S. PATENT DOCUMENTS

| 3,941,194 A | * | 3/1976 | Orthman ..................... 172/311 |
| 3,948,327 A | * | 4/1976 | Parker et al. ................ 172/311 |
| 4,316,511 A | * | 2/1982 | Anderson .................... 172/776 |
| 4,328,869 A | * | 5/1982 | Perelli ........................ 172/311 |
| 4,415,043 A | * | 11/1983 | Hadler et al. ................ 172/776 |
| 4,512,416 A | * | 4/1985 | Smith .......................... 172/776 |
| 4,862,758 A | * | 9/1989 | Magee ......................... 74/103 |
| 4,923,017 A | * | 5/1990 | Meek et al. ................. 172/776 |
| 5,253,717 A | * | 10/1993 | Roush et al. ................ 172/311 |
| 5,540,290 A | | 7/1996 | Peterson et al. ............ 172/311 |
| 6,112,827 A | * | 9/2000 | Reiber et al. ............... 172/311 |
| 6,213,219 B1 | * | 4/2001 | Mosdal et al. .............. 172/311 |
| 6,220,366 B1 | * | 4/2001 | Noonan et al. ............. 172/311 |

* cited by examiner

Primary Examiner—Thomas B. Will
Assistant Examiner—Kristine Markovich

(57) ABSTRACT

A hinge structure for a folding implement frame includes a reversible mounting bracket on the wing side of the hinge to accommodate positioning of the mounting around obstructions such as the tool mounting brackets for certain tool spacing arrangements on the implement frame. A wing bump stop integrated into the mounting bracket on the main or inner frame side of the hinge reduces the number of parts and eliminates another potential obstruction on the frame. The stop includes a mounting hole for the base end of the hydraulic folding cylinder to further reduce parts, obstructions and cost.

16 Claims, 3 Drawing Sheets

HINGE STRUCTURE FOR AN IMPLEMENT

BACKGROUND OF THE INVENTION

1) Field of the Invention

The present invention relates generally to agricultural implements and, more specifically, to hinge structure for such implements.

2) Related Art

Implements having folding wing frames to provide a wide working width while not compromising a narrow transport width often have hinges that facilitate folding angles at or near 180 degrees so the wing frame folds nearly flat against an inner frame. When small wings on the order of three or four feet in width are mounted on the inner frame, rigid fold hinges which do not float up or down typically are used.

Presently available rigid fold hinges often have many parts, are relatively expensive to manufacture, and have frame mounting structure that obstructs frame areas where tools or other frame components otherwise would be mounted. Often, optimum tool spacing has to be compromised to accommodate the hinge and hinge mounting components. A further obstruction is presented when a wing bump stop necessary for limiting pivoting of the wing frame beyond the desired folded position is connected to the frame.

BRIEF SUMMARY OF THE INVENTION

It is therefore an object of the present invention to provide an improved hinge structure for a folding implement frame. It is a further object to provide such an improved hinge structure which overcomes most or all of the aforementioned problems.

It is a further object of the present invention to provide an improved hinge structure for a folding implement frame which is less expensive to manufacture than at least most previously available hinge structures. It is a further object to provide such a hinge structure which is more compact and has fewer and stronger parts than most available hinge structures. It is another object to provide such a hinge structure which more easily accommodates a wide variety of tool spacings and component mounting arrangements without interference.

It is still another object of the present invention to provide an improved hinge structure for a folding implement which is simple and parts efficient in construction. It is another object to provide such a structure having components which can be reversed to facilitate different frame mounting arrangements and which includes elements having more than one function. It is yet another object to provide such a hinge structure which includes an integral stop and cylinder mounting and which eliminates or reduces interference problems between the hinge structure and tool or components mounted on the implement.

A hinge structure constructed in accordance with the teachings of the present invention includes a reversible mounting bracket on the wing side of the hinge to accommodate positioning of the mounting around obstructions such as the tool mounting brackets for certain tool spacing arrangements on the implement frame. Separate mounting brackets for different tool or component configurations are eliminated. A wing bump stop integrated into the mounting bracket on the main or inner frame side of the hinge reduces the number of parts and eliminates another potential obstruction on the frame. The stop has a tapered end which contacts the corner end of the wing frame to minimize interference with tools. In addition, the stop includes a mounting hole for the base end of the hydraulic folding cylinder, which further reduces the number of parts and the number of potential obstructions on the frame. The entire hinge structure therefore is simpler, less expensive and less obstructive to desired tool spacings than at least most previously available hinge structures. A simple angle and plate construction including components having more than one function provides a strong, versatile and compact hinge structure.

These and other objects, features and advantages of the present invention will become apparent to one skilled in the art upon reading the following detailed description in view of the drawings.

DETAILED DESCRIPTION OF THE DRAWINGS

Figure 1:
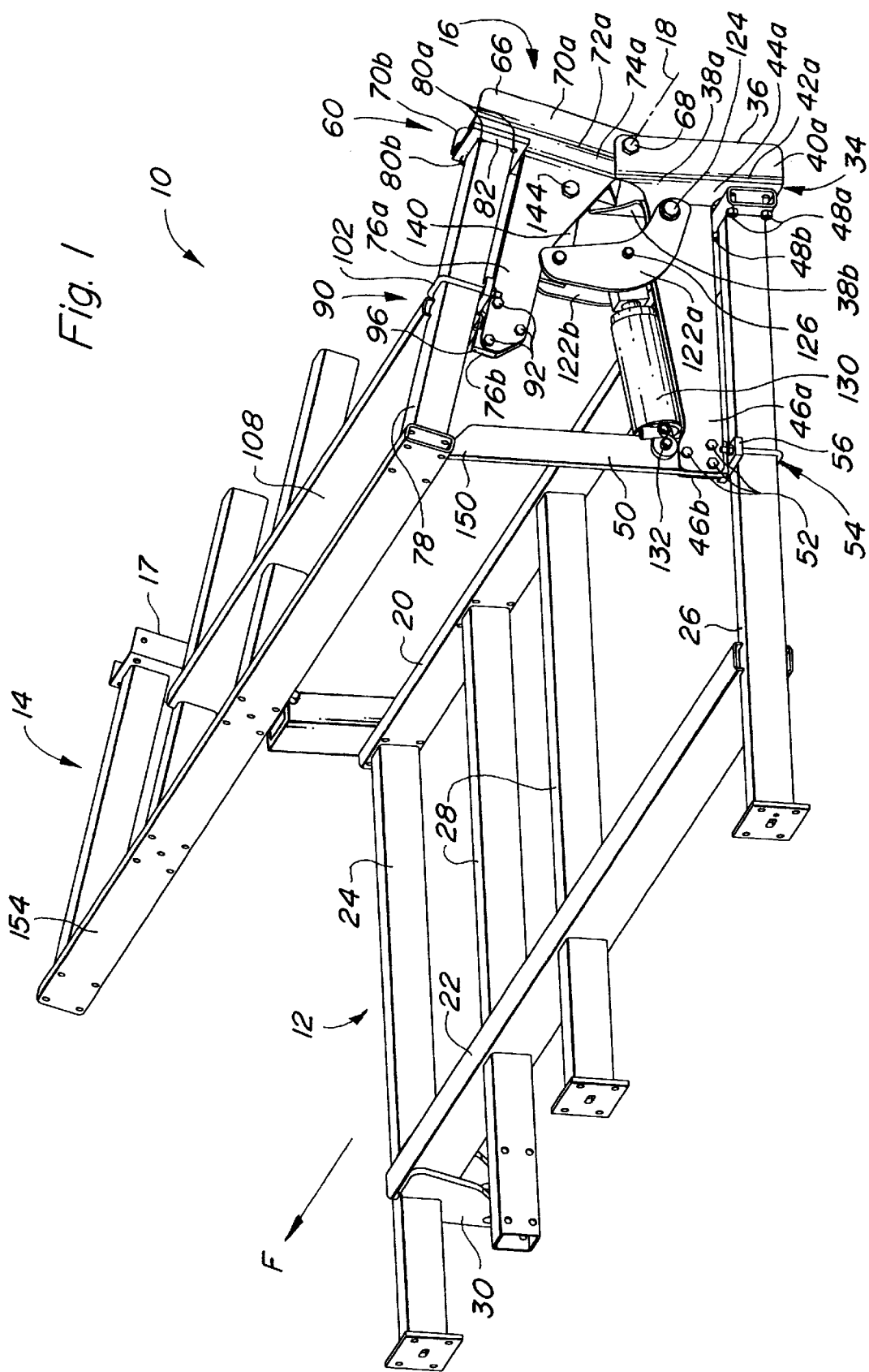
FIG. 1 is a rear perspective view of a portion of an agricultural implement frame including a main frame and a wing frame connected by the hinge structure of the present invention.
Figure 2:
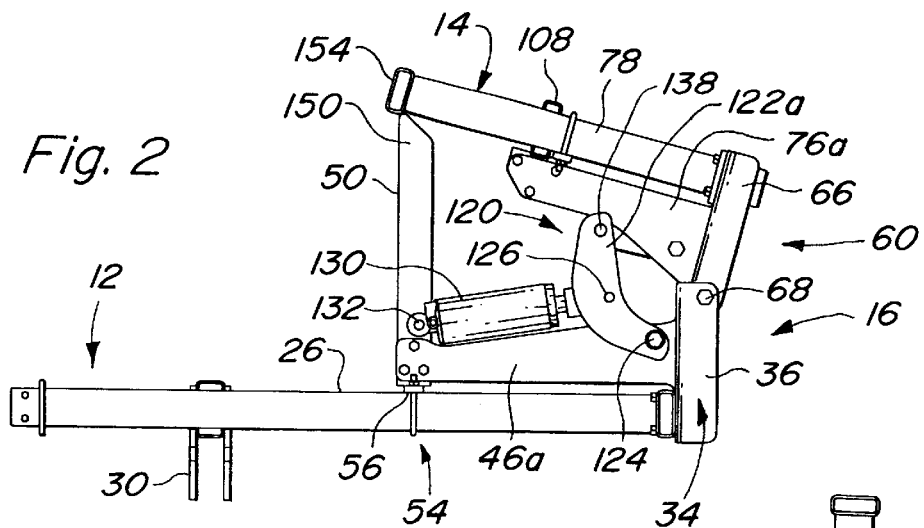
FIG. 2 is a rear view of the hinge structure of FIG. 1 showing the wing frame in the folded or transport position.
Figure 4:
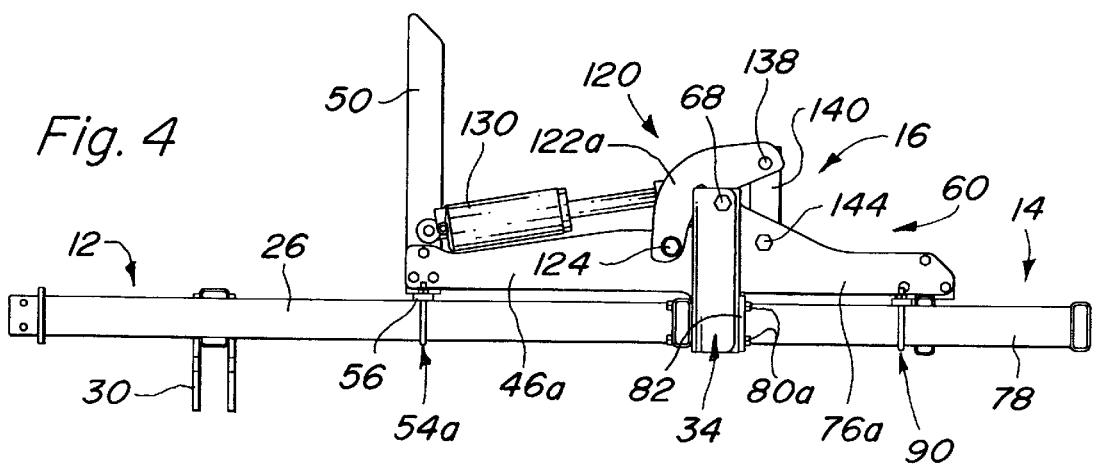
FIG. 4 is a view similar to FIG. 2 but showing the wing frame in the unfolded or field-working position.

Referring now to FIG. 1, therein is shown a portion of an implement 10, such as a field cultivator or chisel plow, including a main or inner frame 12 and an outer or wing frame 14 connected to the frame 12 by hinge structure 16 and 17 for pivoting about a fore-and-aft axis 18 between a folded transport position (FIGS. 1 and 2) and an unfolded field-working position (FIG. 4). The frame 12 includes fore-and-aft extending tubular members 20 and 22 rectangular in cross section and connected by front and rear tubes 24 and 26 and intermediate tubes 28. A hitch connection member 30 extends downwardly from the member 22 and supports a conventional hitch structure (not shown) for towing the implement 10 forwardly (F) over the ground.

The hinge structure 16 includes a main frame hinge member 34 defining an outwardly opening, upright channel portion 36. The hinge member 34 as shown is fabricated from two bent metal plates 38a and 38b. The plate 38b is generally the mirror image of the plate 38a, and therefore only the plate 38a will be described in detail. An upright sideleg 40a defining one side of the channel portion 36 extends inwardly to a bend location 42a to a juncture with a forwardly extending portion 44a. The portion 44a connects with an inwardly directed leg 46a which extends over and parallel to the rear tube 26. Bolts 48a connect a lower apertured portion of the forwardly extending portion 44a to the tubular member 20 at a location rearwardly adjacent the rear tube 26. Similarly, the plate 38b is connected by bolts 48b to the member 20 so that the inwardly directed leg 46b is parallel to but offset forwardly a preselected distance from the leg 46a. The inward ends of the legs 46a and 46b are connected to an upright bump stop plate 50 by three bolts 52 which extend through apertures in the legs 46a and 46b and through the bottom portion of the stop plate 50. The plate spaces the inner ends of the legs 46a and 46b apart. A stop plate bracket or U-bolt assembly 54 including a two-hole strap 56 attached to the lower end of the stop plate 50 connects the stop plate 50 to the rear tube 26. The strap 56 supports the legs 46a and 46b above the top of the tube 26 to accommodate tool mounting hardware on the tube 26 between the bump stop assembly and the member 20.

The hinge structure 16 also includes a wing frame hinge member 60 having a channel portion 66 connected by a pivot pin 68 to the channel portion 36. The member 60 is constructed from two bent metal plates in a manner similar to the hinge member 34. An upright sideleg 70a defining one side of the channel portion 66 extends inwardly to a bend location 72a to a juncture with a forwardly extending portion 74a. The portion 74a connects with an inwardly directed leg 76a which is offset from and parallel to a rear tube 78 of the wing frame 14.

Bolts 80a connect the portion 74a to the inner end of the rear tube 78 via plate 82. Similarly, the opposite portion 74b is connected by bolts 80b to the rear tube 78 so that the inwardly directed leg 76b is parallel to but offset forwardly a preselected distance from the leg 76a. The ends of the legs 76a and 76b are connected to a reversible mounting bracket assembly 90 by three bolts 92 which extend through apertures in the distal ends of the legs 76a and 76b and through corresponding apertures in the assembly 90.

Figure 5:
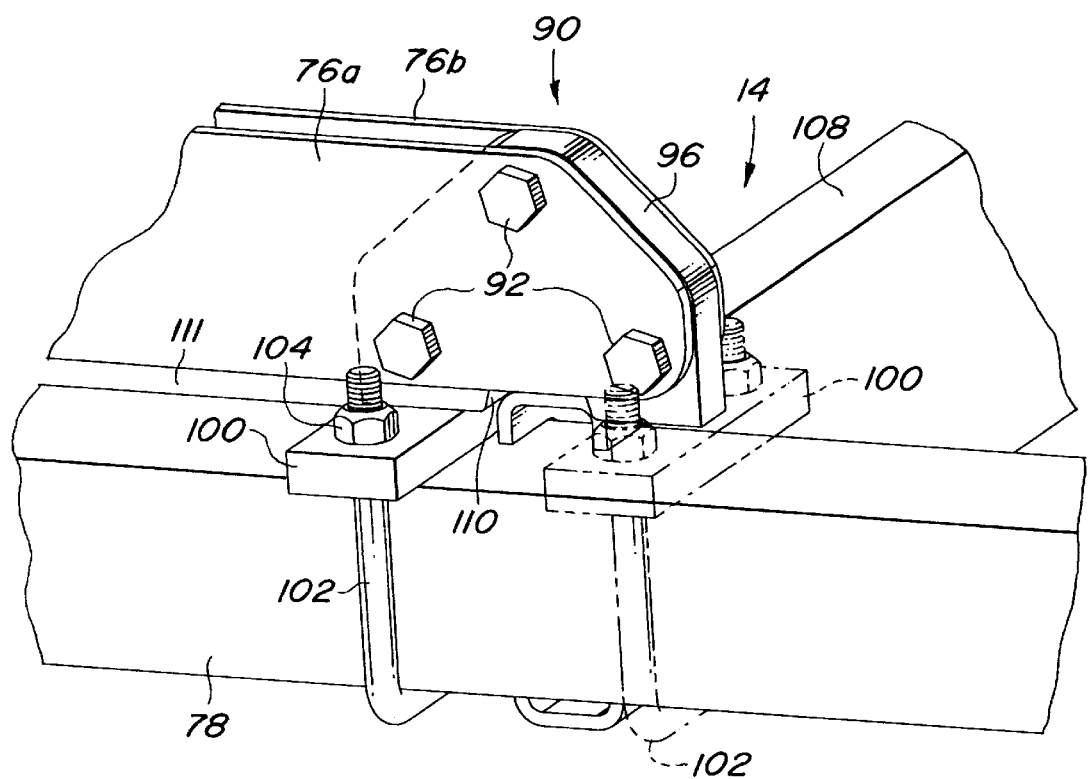
FIG. 5 is an enlarged view of the outer portion of the hinge of FIG. 4 and showing the bracket connected to the wing frame in a first position (solid lines) and reversed in a second position (broken lines).

The assembly 90 (FIG. 5) includes a support plate 96 which spaces the inner ends of the legs 76a and 76b and secures the legs in a generally parallel relationship and offset relative to the top surface of the tube 78. The plate 96 includes three apertures which align with the apertures in the distal ends of the legs 76a and 76b. The apertures are symmetrically arranged such that the plate 96 can be mounted with either of its sides extending outwardly. An attaching plate or U-bolt receiving plate 100 is fixed to one side of the bottom of the plate 96 and extends transversely to the plate. A U-bolt 102 extending around the rear tube 78 and through apertures in the plate 100 is secured by nuts 104 tightened against the plate 100 to fix the ends 76a and 76b to the tube 78. As shown by the solid lines in FIG. 5, the support plate 96 is mounted in a first position with the plate 100 inwardly adjacent a fore-and-aft extending tube 108. If for any reason a portion of the assembly 90 such as the plate 100 and U-bolt 102 interfere with the desired positioning of a tool or other element at that location, the assembly 90 may be reversed (broken lines of FIG. 5) so the plate 100 is positioned at the end of the plates 76a and 76b outwardly adjacent the tube 108. The plate 96 includes a central recess 110 to accommodate the end of the tube 108 and facilitates mounting a bracket or other structure adjacent the central portion of the plate 96. The attaching plate 100 offsets the second hinge member vertically relative to the tube 78 to provide an accommodation space 111 for mounting elements on the tube 78 inwardly adjacent the assembly 100.

A folding hinge linkage 120 includes upright parallel links 122a and 122b having lower ends pivotally connected by a pivot pin 124 to the base portions of the legs 46a and 46b. The central portion of the links 122a, 122b are connected by a pin 126 to the rod end of a wing fold cylinder 130. The base end of the cylinder 130 is connected at a pin 132 to the lower portion of the stop plate 50. Upper ends of the links 122a and 122b are pivotally connected at a pin 138 to one end of a connecting link 140. The opposite end of the connecting link 140 is pivotally connected between the proximate ends of the sidelegs 76a and 76b by a pin 144.

In the folded or transport position shown in FIGS. 1 and 4, the cylinder 130 is retracted, and the links 122a and 122b are pivoted about the pin 124 in a counterclockwise direction with the link 140 approaching a horizontal position and the upper ends of the links 122a and 122b embracing the sides 76a and 76b. The upper end of the stop plate 50 is tapered at 150 and contacts the rear tube 78 at a location adjacent the connection of the tube 78 with a fore-and-aft extending tube 154. The contact area is minimal and at a location where a tool or other element is not located to eliminate interference problems between the wing frame and wing stop. In addition, by placing the contact area adjacent tube connections, a strong support area is provided.

Figure 3:
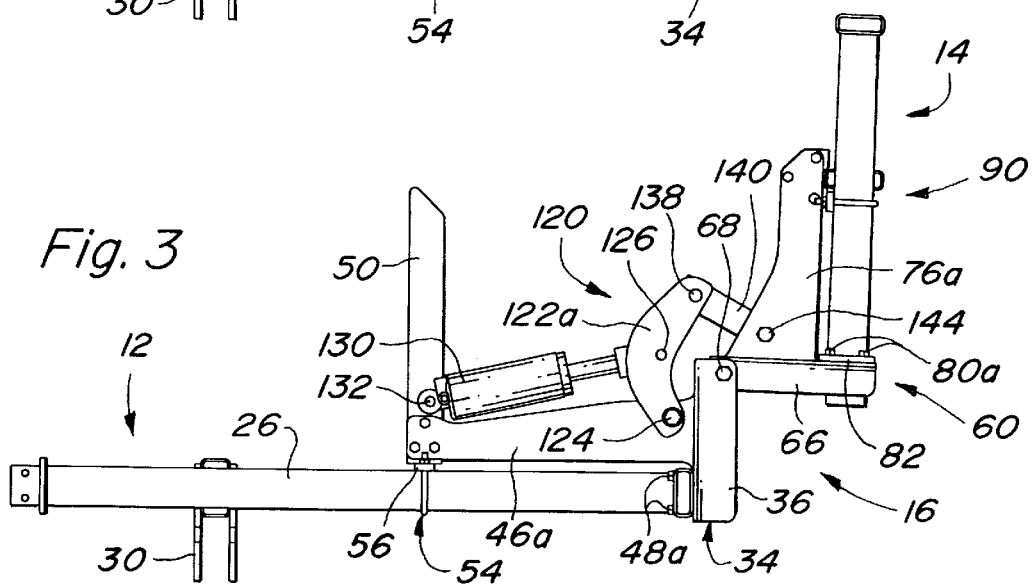
FIG. 3 is a view similar to FIG. 2 but showing the wing frame between the transport and field-working positions.

As the cylinder 130 is extended (FIG. 3), the wing frame 14 is rotated in the clockwise direction about the pin 68. The channel portion 66 pivots within the channel portion 36 to an unfolded or fully extended position (FIG. 4) of the frame wherein the tube 78 extends outwardly from the tube 26.

Having described the preferred embodiment, it will become apparent that various modifications can be made without departing from the scope of the invention as defined in the accompanying claims.

I claim:

1. A folding agricultural implement including a transversely extending, tool supporting first frame with a frame end, and a second tool supporting frame pivotally connected to the first frame for movement of the second frame between an extended field-working position and a folded transport position, folding hinge structure comprising:

a hinge connected between the first and second frames and including a hinge member attached to the frame end, the hinge member having an inward end extending inwardly from the frame end;

an upright stop having a lower end and an upper end adapted for contacting the second frame and providing support for the second frame when the second frame is in the transport position;

mounting structure releasably securing the inward end of the hinge member to the first frame and supporting the lower end of the upright stop from the first frame, wherein the mounting structure eliminates need for separate structures attaching the stop and the hinge member to the first frame.

2. The implement as set forth in claim 1 further comprising a hinge linkage connected between the first and second frames, a cylinder having a first end connected to the upright stop and a second end connected to the hinge linkage and moving the second frame between the field-working and transport positions.

3. The implement as set forth in claim 1 wherein the inward end of the hinge member includes first and second spaced connecting portions, and the mounting structure comprises a bottom portion of the upright stop which extends between the spaced connecting portions.

4. The implement as set forth in claim 3 wherein the hinge comprises first and second bent metal plates defining generally complimentary hinge halves connected by bolts to the upright stop, and wherein the upright stop spaces the inward end portion of the hinge member above the first frame to provide an accommodation space for mounting tools on the first frame between the stop and the frame end.

5. The implement as set forth in claim 3 wherein the upright stop comprises a planar member having an upper end which tapers to define a narrow contact area for contacting the second frame when the second frame is in the transport position so that interference between the stop member and tools on the second frame is minimized.

6. The implement as set forth in claim 1 wherein the hinge includes a second hinge member connected to the second frame and having a hinge end with spaced walls, and further comprising a reversible mounting member including a plate selectively attachable in first and second positions between the walls, the mounting member supported at one location on the second frame when the plate is attached in the first position and at a second location on the second frame when the plate is attached in the second position so that the mounting member can be positioned to avoid interference with mounting of tools on the second frame.

7. In a folding agricultural implement having transversely extending, tool supporting first and second frames, a hinge structure pivotally connecting the frames for movement of the second frame relative to the first frame about a folding axis between an extended field-working position and a folded transport position, the hinge structure comprising:

a first hinge member attached to the first frame;

a second hinge member pivotally connected to the first hinge member and including an apertured leg portion; and attaching structure connecting the second hinge member to a planar surface of the second frame and including an apertured plate having opposite sides, the apertured plate attachable to the apertured leg portion in a first mounting position, the attaching structure rotatable 180 degrees about an axis generally perpendicular to the planar surface from the first mounting position to a second mounting position wherein the opposite sides are reversed relative to the apertured leg portion, and bolts insertable through the apertured portion and apertured plate and connecting the plate to the apertured leg portion in a selected one of the mounting positions, the attaching structure further comprising an attaching plate abutting a first location on the planar surface when the first position of the apertured plate is selected and abutting a second location on the planar surface offset from the first location when in the second position of the apertured plate is selected, and wherein the attaching structure includes bolt structure fixing the attaching plate to the second frame, whereby the position of the apertured plate can be selected to eliminate interference between the attaching structure and tools mounted on the first and second frames.

8. The implement as set forth in claim 7 wherein the apertured leg portion includes first and second spaced legs and the attaching plate is sandwiched between the legs and secured to the legs by the bolts.

9. The implement as set forth in claim 7 wherein the attaching plate offsets the second hinge member relative to the second frame to provide an accommodation space for mounting tools adjacent the bracket structure.

10. A folding agricultural implement including:

a first frame having an elongated tubular frame member supporting an element at different support locations along the tubular frame member;

a second frame;

hinge structure connected to an end of the frame member and connecting the first and second frames for pivoting about a hinge axis;

a folding cylinder connected between the first and second frames for moving the second frame about the hinge axis between an extended field-working position and a folded transport position;

an elongated stop extending from the frame member towards the second frame at a location offset from the hinge axis and providing support for the second frame when the second frame is in the transport position;

mounting structure releasably securing the stop to the tubular frame member and facilitating mounting of the bracket to accommodate the support of the element at the different support locations;

the hinge structure including an elongated leg extending to a connection with the elongated stop; and wherein the stop includes a cylinder support supporting the cylinder and thereby eliminating a need for separate cylinder mounting structure.

11. The implement as set forth in claim 10 wherein the leg extends generally parallel to the tubular frame member and offset therefrom, the leg having a first end connected to the hinge structure and a second end connected to the stop adjacent the cylinder support to define an integrated hinge support and cylinder support which facilitates mounting of the element between the ends of the leg on the tubular frame member.

12. The implement as set forth in claim 10 wherein the hinge structure includes a reversible bracket having a first position connecting the hinge to a first location on the second frame and a reversed position connecting the hinge at a second location on the second frame.

13. The implement as set forth in claim 11 wherein the hinge structure includes a channel shaped member connected to the first frame, and wherein the first end of the leg is connected to the channel shaped member.

14. The implement as set forth in claim 13 wherein the hinge structure is integral with the elongated leg.

15. The implement as set forth in claim 14 wherein the hinge structure includes complimentary bent metal sections bolted together to define the channel shaped configuration.

16. The implement as set forth in claim 15 wherein the stop comprises a plate connected between the bent metal sections.

* * * * *